United States Patent
Dickinson et al.

(10) Patent No.: US 10,089,665 B2
(45) Date of Patent: Oct. 2, 2018

(54) SYSTEMS AND METHODS FOR EVALUATING A CREDIBILITY OF A WEBSITE IN A REMOTE FINANCIAL TRANSACTION

(71) Applicant: MasterCard International Incorporated, Purchase, NY (US)

(72) Inventors: Bradley Kenneth Dickinson, O'Fallon, MO (US); Jason Hull, Dardenne Prairie, MO (US); Christopher Eric Mullen, St. Peters, MO (US); Kelly Elaine Atwood, O'Fallon, MO (US); Corey M Hively, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 312 days.

(21) Appl. No.: 14/881,248

(22) Filed: Oct. 13, 2015

(65) Prior Publication Data
US 2017/0103438 A1    Apr. 13, 2017

(51) Int. Cl.
*G06Q 30/00* (2012.01)
*G06Q 30/06* (2012.01)

(52) U.S. Cl.
CPC ................ *G06Q 30/0609* (2013.01)

(58) Field of Classification Search
CPC ......................... G06Q 30/06–30/08
USPC ............................... 705/26.1–27.2
See application file for complete search history.

(56) References Cited

U.S. PATENT DOCUMENTS

| | | | |
|---|---|---|---|
| 8,874,074 B2 | 10/2014 | Bacareza et al. | |
| 8,903,941 B1 | 12/2014 | Kaul | |
| 2001/0034709 A1 | 10/2001 | Stoifo et al. | |
| 2002/0010625 A1* | 1/2002 | Smith | G06Q 30/02 705/14.52 |
| 2003/0014265 A1* | 1/2003 | Landry | G06Q 10/10 705/309 |
| 2008/0086387 A1* | 4/2008 | O'Rourke | G06F 17/30867 705/26.1 |
| 2009/0070873 A1 | 3/2009 | McAfee et al. | |
| 2011/0252052 A1* | 10/2011 | Fishkin | G06F 17/30864 707/769 |
| 2011/0302155 A1* | 12/2011 | Yan | G06F 17/30867 707/723 |
| 2012/0072384 A1* | 3/2012 | Schreiner | G06Q 30/02 706/45 |
| 2016/0164903 A1* | 6/2016 | Murynets | H04L 63/1433 726/25 |

* cited by examiner

*Primary Examiner* — Ethan D Civan

(57) ABSTRACT

Examples of the disclosure enable a user to evaluate a credibility of a website and/or a merchant in a remote financial transaction. In some embodiments, a request for a score is received from a client device. The request includes usage data associated with the client device. A website and/or merchant is identified based on the usage data, and customer experience-related data associated with the website and/or the merchant are retrieved from one or more sources. A first score is generated at a score generator based on the retrieved customer experience-related data, and the first score is transmitted to the client device for presentation at the client device.

20 Claims, 6 Drawing Sheets

SYSTEMS AND METHODS FOR EVALUATING A CREDIBILITY OF A WEBSITE IN A REMOTE FINANCIAL TRANSACTION

FIELD OF THE DISCLOSURE

The subject matter described herein relates generally to electronic commerce and, more specifically, to evaluating a credibility of a website or an online merchant to increase cardholder confidence for a remote financial transaction.

BACKGROUND

The Internet is increasingly being used to conduct financial transactions (e.g., e-commerce transactions). For example, a cardholder may browse the Internet for goods or services being marketed and/or offered for sale on one or more websites. While finding a merchant website that markets and/or offers for sale one or more goods or services over the Internet may be relatively easy, evaluating a credibility of the merchant website and/or the merchant associated with the merchant website may be difficult, tedious, and/or time consuming and, in at least some cases, may discourage the cardholder from entering into a financial transaction with the merchant.

SUMMARY

Embodiments of the disclosure enable a cardholder to evaluate a credibility of one or more entities on the Internet in a remote financial transaction. In one aspect, a method is provided for evaluating a credibility of a website and/or a merchant associated with the website in a remote financial transaction. The method includes receiving, from a client device, usage data associated with the client device, identifying the website and/or the merchant based on the usage data, retrieving, from one or more sources, customer experience-related data associated with the website and/or the merchant, generating, at a score generator, a first score associated with the website and/or the merchant based on the retrieved customer experience-related data, and transmitting, to the client device, the first score for presentation at the client device.

In another aspect, a computing device is provided for evaluating a credibility of an entity in a remote financial transaction. The computing device includes a memory storing data associated with the one or more entities and computer-executable instructions, and a processor configured to execute the computer-executable instructions to generate one or more scores based on the data associated with the one or more entities, receive, from a client device, a request for a score including usage data associated with the client device, identify a first entity of the one or more entities based on the usage data, and, on condition that the one or more generated scores include a first score that corresponds with the identified first entity, transmit, to the client device, the first score.

In yet another aspect, a computer-readable storage device having computer-executable instructions embodied thereon is provided. Upon execution by at least one processor, the computer-executable instructions cause the processor to generate one or more scores associated with one or more entities based on customer experience-related data, receive, from a client device, a request for a score, retrieve, from the client device, usage data associated with the client device, identify a first entity of the one or more entities based on the usage data, and transmit, to the client device, a score indicative of a projected customer experience associated with the first entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
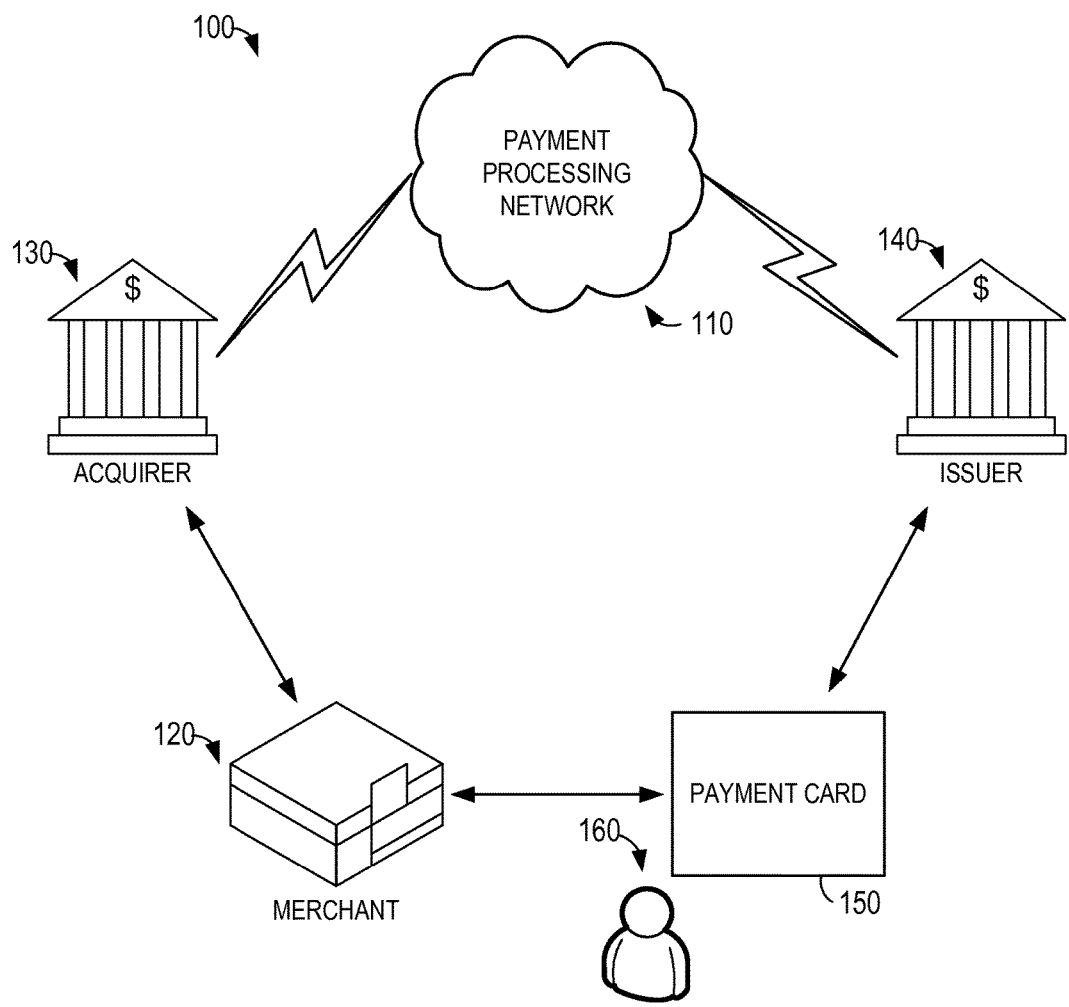
FIG. 1 is a block diagram illustrating an example environment for processing financial transactions.

The subject matter described herein relates generally to electronic commerce and, more specifically, to evaluating a credibility of an online entity (e.g., website, merchant associated with a website) to increase cardholder confidence for a remote financial transaction. Embodiments of the disclosure provide the ability to shop on the Internet with increased knowledge about websites and/or merchants associated with the websites, thereby providing at least some additional protection from being defrauded. Embodiments described herein enable a computer system to receive a score request for a website and/or a merchant associated with the website, generate one or more scores based on customer experience-related data, and transmit a score corresponding with the website and/or the merchant associated with the website.

Aspects of the disclosure provide for a processing system that evaluates a credibility of one or more websites and/or merchants associated with the websites for one or more remote financial transactions in an environment including a plurality of devices coupled to each other via a network (e.g., the Internet). For example, a credibility evaluation computing device may generate a score for a target website and/or a merchant associated with the target website, and/or generate a recommendation of one or more websites and/or merchants associated with the target website and/or the merchant associated with the target website to increase cardholder confidence for one or more remote financial transactions. The score and/or recommendation may be generated based on usage data and/or customer experience-related data. In this manner, the cardholder may be alerted or notified before entering into a financial transaction on a less-than-credible website and/or with a less-than-credible merchant and, in at least some embodiments, be presented with one or more recommended websites as an alternative to the less-than-credible website.

The systems and processes described herein may be implemented using computer programming or engineering techniques including computer software, firmware, hardware or a combination or subset thereof. At least one technical problem with known e-commerce systems is that, with the volume of information available on the Internet, it can be difficult, tedious, and/or time consuming to determine whether a particular system (e.g., a website) is secure, reliable, and/or credible. The embodiments described herein address that technical problem. For example, by conducting financial transactions in the manner described in this disclosure, some embodiments improve cardholder confidence for remote financial transactions by receiving and/or retrieving customer experience-related data from a plurality of sources, generating scores that are indicative of projected cardholder experiences, and generating recommendations to facilitate remote financial transactions. Additionally, some embodiments may improve processor security and/or data transmission security by enabling a user to avoid entering into a remote financial transaction with a less-secure, less-reliable, and/or less-credible merchant; improve user efficiency and/or user interaction performance via user interface interaction; and/or reduce error rate by automating the evaluation of e-commerce systems.

The technical effect of the systems and processes described herein is achieved by performing at least one of the following operations: a) receiving a request for a score; b) identifying a website and/or a merchant; c) retrieving customer experience-related data associated with the website and/or the merchant; d) identifying at least one source based on the website and/or the merchant; e) identifying that a portion of the customer experience-related data is associated with a whitelist; f) identifying that a portion of the customer experience-related data is associated with a blacklist; g) generating a score; h) biasing the score to be a neutral score; i) associating a weight with a portion of the customer experience-related data; j) determining whether the score satisfies a predetermined threshold; k) transmitting the score for presentation at a client device; l) identifying a product; and m) transmitting a recommendation for presentation at the client device.

FIG. 1 is a block diagram illustrating an example system or environment 100 for processing financial transactions. The environment 100 includes a processing network 110, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 100 includes one or more merchants 120 that accept payment via the processing network 110. To accept payment via the processing network 110, the merchant 120 establishes a financial account with an acquirer 130 that is a member of the processing network 110. The acquirer 130 is a financial institution that maintains a relationship with one or more merchants 120 to enable the merchants 120 to accept payment via the processing network 110. The acquirer 130 may also be known as an acquiring bank, a processing bank, or a merchant bank.

The environment 100 includes one or more issuers 140 that issue or provide payment cards 150 (e.g., credit card, debit card, prepaid card, and the like) or other payment products to one or more cardholders 160 or, more broadly, account holders ("cardholder" and "account holder" may be used interchangeably herein). The issuer 140 is a financial institution that maintains a relationship with one or more cardholders 160 to enable the cardholders 160 to make a payment using the payment card 150 via the processing network 110.

A cardholder 160 uses a payment product, such as a payment card 150, to purchase a good or service from a merchant 120. In some embodiments, the payment card 150 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 150 to purchase a good or service from a merchant 120. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 160 may use any payment product that is linked or associated with a corresponding financial account maintained by an issuer 140. As described herein, the term "payment card" includes credit cards, debit cards, prepaid cards, digital cards, smart cards, and any other payment product that is linked or associated with a corresponding financial account maintained by an issuer 140. Payment cards 150 may have any shape, size, or configuration that enables the environment 100 to function as described herein.

A cardholder 160 may present the merchant 120 with a payment card 150 to make a payment to the merchant 120 in exchange for a good or service. Alternatively, the cardholder 160 may provide the merchant 120 with account information associated with the payment card 150 without physically presenting the payment card 150 (e.g., for remote financial transactions, including e-commerce transactions, card-not-present transactions, or card-on-file transactions). Account information may include a name of the cardholder 160, an account number, an expiration date, a security code (such as a card verification value (CVV), a card verification code (CVC), and the like), and/or a personal identification number (PIN).

The merchant 120 requests authorization from an acquirer 130 for at least the amount of the purchase. The merchant 120 may request authorization using any financial transaction computing device configured to transmit account information of the cardholder 160 to one or more financial transaction processing computing devices of the acquirer 130. For example, the merchant 120 may request authorization through a point-of-sale (POS) terminal, which reads account information of the cardholder 160 from a microchip or magnetic stripe on the payment card 150, and transmits the cardholder's account information to the one or more financial transaction processing computing devices of the acquirer 130. For another example, the POS terminal reads account information of the cardholder 160 from a device configured to communicate with the POS terminal using contactless payment technology, and transmits the cardholder's account information to one or more financial transaction processing computing devices of the acquirer 130.

Using the processing network 110, the financial transaction processing computing devices of the acquirer 130 communicate with one or more financial transaction processing computing devices of an issuer 140 to determine whether the account information of the cardholder 160 matches or corresponds with the account information of the issuer 140, whether the account is in good standing, and/or whether the purchase is covered by (e.g., less than) a credit line or account balance associated with the financial account. Based on these determinations, the financial transaction processing computing devices of the issuer 140 determine whether to approve or decline the request for authorization from the merchant 120.

If the request for authorization is declined, the merchant 120 is notified as such, and may request authorization from the acquirer 130 for a lesser amount or request an alternative form of payment from the cardholder 160. If the request for authorization is approved, an authorization code is issued to the merchant 120, and the cardholder's available credit line or account balance is decreased. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer 130 for reimbursing the merchant 120. When a credit card is used, the issuer 140 may bill the cardholder 160 to settle a financial account associated with the cardholder 160. When a debit or prepaid card is used, the issuer 140 may automatically withdraw funds from the account.

Figure 2:
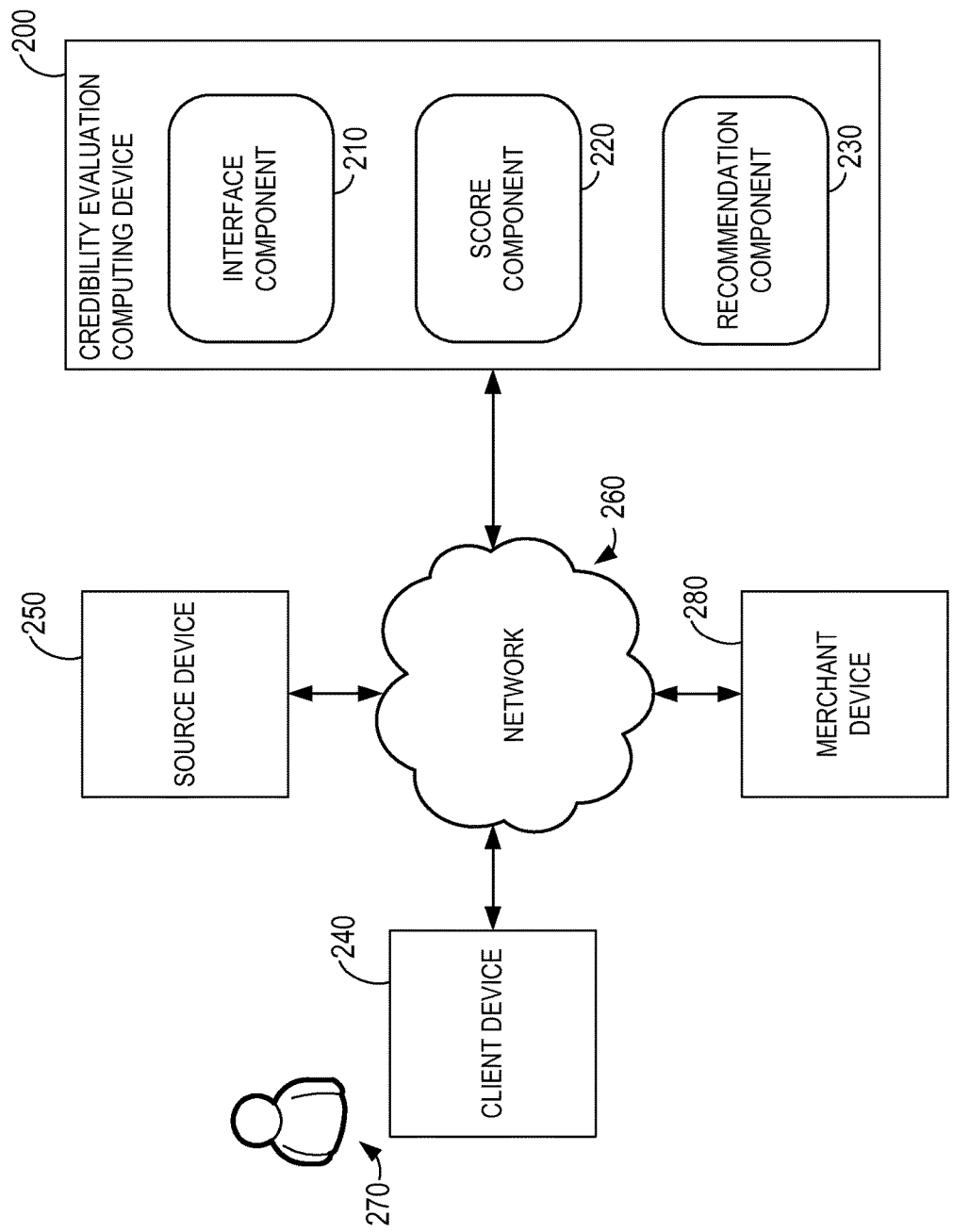
FIG. 2 is a block diagram illustrating example modules that may be used to evaluate a credibility of a website and/or a merchant associated with the website.

FIG. 2 is a block diagram illustrating example modules that may be used to evaluate a credibility of one or more websites and/or merchants associated with the websites (e.g., merchant 120) in the environment 100 (shown in FIG. 1) using a credibility evaluation computing device 200. In some embodiments, the credibility evaluation computing device 200 is associated with the issuer 140. Alternatively, the credibility evaluation computing device 200 may be associated with any entity that enables the environment 100 to function as described herein. The credibility evaluation computing device 200 includes an interface component 210, a score component 220 (e.g., a score generator), and/or a recommendation component 230 (e.g., a recommendation generator).

The interface component 210 enables the credibility evaluation computing device 200 to receive data from and/or transmit data to another device, such as a client device 240 or a source device 250. In some embodiments, the interface component 210 receives data from and/or transmits data to another device via a network 260 (e.g., the Internet). The client device 240 may be a desktop computer, a laptop, a mobile device, a tablet, and/or any other computing device that allows a user 270 (e.g., cardholder 160) to access one or more websites via the network 260. In some embodiments, the user 270 uses a web browser at the client device 240 to access one or more websites hosted on one or more merchant devices 280. Data is received and/or retrieved from the one or more merchant devices 280 while the one or more websites are being accessed, and the client device 240 accumulates usage data associated with the one or more websites accessed by the client device 240. Usage data includes browsing history, cookies, site data, and/or any other data indicative of a usage of the client device 240 to access one or more websites. For example, usage data may be used to determine a website currently being presented on the web browser and/or a website previously presented on the web browser and, in at least some embodiments, a website anticipated or projected to be presented on the web browser.

Additionally, the client device 240 may allow the user 270 to make a payment to the merchant 120 with account information associated with the payment card 150. For example, the user 270 may enter account information associated with the payment card 150 at the client device 240, which transmits the account information to the merchant and/or to a financial transaction processing computing device.

The interface component 210 is coupled to and/or communicates with the score component 220 and/or the recommendation component 230 to facilitate communication between another device (e.g., a client device 240, a source device 250) and the score component 220 and/or the recommendation component 230. For example, the interface component 210 may retrieve and/or receive from a client device 240 one or more requests for a score and/or usage data, retrieve and/or receive from a source device 250 customer experience-related data associated with one or more entities (e.g., websites, merchants), communicate with the score component 220 to generate one or more scores, and transmit to the client device 240 one or more scores for presentation at the client device 240. Additionally or alternatively, the interface component 210 may retrieve and/or receive from a client device 240 usage data, retrieve and/or receive from a source device 250 customer experience-related data associated with one or more entities, communicate with the recommendation component 230 to generate one or more recommendations, and transmit to the client device 240 one or more recommendations for presentation at the client device 240.

The score component 220 is configured to communicate with the interface component 210, and generate one or more scores associated with one or more websites. For example, a score may be generated for a website associated with usage data received from the client device 240 (e.g., a website currently being presented on the web browser). Additionally or alternatively, the score component 220 may be configured to generate one or more scores associated with one or more merchants.

The score may be transmitted, to the client device 240 (e.g., via the interface component 210), and presented to a user 270 at the client device 240. For example, the score may be presented as a light on a traffic signal (e.g., a green light for a positive score, a yellow light for a neutral score, a red light for a negative score). Additionally or alternatively, the score may be presented as one of a plurality of shapes or symbols (e.g., a green circle for a positive score, a yellow inverted-triangle for a neutral score, a red octagon for a negative score). While some of the embodiments described herein describe three categories of scores (e.g., a positive score, a negative score, and a neutral score), it is contemplated that the score be categorized in one of any number of categories. For example, the score may be presented as a five-star rating ranging from one star for a poor score to five stars for an excellent score. Additionally or alternatively, the score may be presented as a number (e.g., an integer) on a ten-point scale ranging from one for a poor score to ten for an excellent score.

The one or more scores may be generated based on data or information received from one or more source devices 250. Customer experience-related data associated with an entity may be received or retrieved from one or more source devices 250 including, for example, a Member Alert to Control High-Risk Merchants (MATCH) system (e.g., a MASTERCARD MATCH® brand database), a digital wallet system (e.g., a MASTERPASS® brand database), a merchant account number (e.g., merchant ID) system, a domain registration data system (e.g., a Whois database), a BETTER BUSINESS BUREAU® or BBB® brand system, a user generated content-based review system, and the like (MASTERCARD MATCH® and MASTERPASS® are registered trademarks of MasterCard International Incorporated located in Purchase, N.Y.; BETTER BUSINESS BUREAU® and BBB® are registered trademarks of the Council of Better Business Bureaus, Inc. located in Arlington, Va.).

In some embodiments, the score is indicative of an anticipated or projected customer experience on a website based on customer experience-related data associated with the website and/or a merchant associated with the website. That is, a positive score may be indicative of a website that is anticipated to provide a positive customer experience, a negative score may be indicative of a website that is anticipated to provide a negative customer experience, and a neutral score may be indicative of a website that is anticipated to provide a neutral customer experience. The score may be determined to be a positive score when a first portion of customer experience-related data that is associated with one or more positive customer experiences is valued more than a second portion of customer experience-related data that is associated with one or more negative customer experiences. Conversely, the score may be determined to be a negative score when a first portion of customer experience-related data that is associated with one or more positive customer experiences is valued less than a second portion of customer experience-related data that is associated with one or more negative customer experiences.

In some embodiments, the score is biased to be a neutral score. That is, in the absence of customer experience-related data or when the customer experience-related data is associated with only neutral customer experiences (e.g., no customer experience-related data is associated with a positive customer experience or with a negative customer experience), the score remains a neutral score. Additionally, when a first portion of customer experience-related data associated with one or more positive customer experiences is offset by a second portion of customer experience-related data associated with one or more negative customer experiences (e.g., the first portion of customer experience-related data is valued the same as or substantially similar to the second portion), the score remains a neutral score.

In some embodiments, the score remains a neutral score until or unless the customer experience-related data has an absolute value (e.g., a distance from zero or equilibrium) that is equal to or greater than a predetermined threshold. That is, when the customer experience-related data has a value that does not meet or exceed a predetermined threshold (e.g., is closer to zero than the predetermined threshold), the score is determined to be a neutral score. When the customer experience-related data has a negative value that meets or exceeds a predetermined threshold (e.g., is further from zero than the predetermined threshold), the score is determined to be a negative score. Conversely, when the customer experience-related data has a positive value that meets or exceeds a predetermined threshold (e.g., is further from zero than the predetermined threshold), the score is determined to be a positive score.

The content and/or metadata associated with the customer experience-related data are identified and/or analyzed to determine whether they are associated with or indicative of a positive customer experience, a negative customer experience, or a neutral customer experience. That is, the customer experience-related data may be analyzed to determine whether its content and/or metadata is suggestive of an entity that provides a positive customer experience, a neutral customer experience, and/or a negative customer experience. For example, the score component 220 may associate a BBB® brand rating of "A" with a history of positive customer experiences, and associate a BBB® brand rating of "F" with a history of negative customer experiences. Additionally or alternatively, the score component 220 may determine that a relatively long (e.g., ten years) and continuous domain name registration is suggestive of a positive customer experience (e.g., by doing business with a stable merchant), and a relatively short (e.g., one month) and/or intermittent domain name registration is suggestive of a negative customer experience (e.g., by doing business with a less-than-stable merchant). Additionally or alternatively, the score component 220 may determine that a merchant having a predetermined number (e.g., one or more) of brick-and-mortar locations is suggestive of a positive customer experience, and a merchant having no brick-and mortar locations (e.g., exclusively e-commerce merchant) is suggestive of a negative customer experience.

In some embodiments, the association of the entity with a source device 250 itself may be indicative of a positive customer experience, a negative customer experience, or a neutral customer experience. For example, the score component 220 may associate the identification of a merchant as an approved merchant in the MASTERPASS® brand database with a positive customer experience. Additionally or alternatively, the score component 220 may associate the identification of a merchant as a terminated merchant in the MASTERCARD MATCH® brand database with a negative customer experience. Any customer experience-related data (including content and metadata) that may be indicative of a reliability, credibility, stability, consistency, and the like of an entity (e.g., a transaction volume, a rate of chargeback, an approval rating) may be used to determine a score for the entity.

A first portion of the customer experience-related data may include or be associated with data and/or a source (e.g., a source device 250) that is more reliable or credible than data and/or a source associated with a second portion of the customer experience-related data. For example, the first portion may be evaluated by a trusted source, and the second portion may be unevaluated or evaluated by an unreliable or not-yet-trusted source. The score may be weighted to value the first portion of the customer experience-related data more than the second portion of the customer experience-related data. For example, the score component 220 may value a BBB® brand rating more than a user generated content-based review system rating and associate the BBB® brand rating with a greater weight than the user generated content-based review system rating.

In some embodiments, a portion of the customer experience-related data may be associated with a whitelist that allows the score component 220 to automatically associate the website with a positive score. For example, the score component 220 may recognize that merchants identified as approved merchants in the MASTERPASS® brand database have already been evaluated by a trusted source and, thus, value the customer experience-related data such that a website associated with a merchant that is identified as an approved merchant in the MASTERPASS® brand database is automatically associated with a positive score (e.g., without taking into consideration other customer experience-related data). In some embodiments, customer experience-related data associated with the inverse or opposite of the whitelist does not result in the website being automatically associated with a negative score (e.g., a website associated with a merchant that is not identified as an approved merchant in the MASTERPASS® brand database would not be associated with a negative score without taking into consideration other customer experience-related data). Alternatively, in at least some embodiments, customer experience-related data associated with the inverse or opposite of the whitelist allows the score component 220 to automatically associate the website with a negative score (e.g., a website associated with a merchant that is not identified as an approved merchant in the MASTERPASS® brand database would be associated with a negative score without taking into consideration other customer experience-related data).

In some embodiments, a portion of the customer experience-related data may be associated with a blacklist that allows the score component 220 to automatically associate the website with a negative score. For example, the score component 220 may recognize that merchants having a BBB® brand rating of "F" have already been evaluated by a trusted source and, thus, value the customer experience-related data such that a website associated with a merchant having a BBB® brand rating of "F" is automatically associated with a negative score (e.g., without taking into consideration other customer experience-related data). In some embodiments, customer experience-related data associated with the inverse or opposite of the blacklist does not result in the website being automatically associated with a positive score (e.g., a website associated with a merchant that has a BBB® brand rating of "A" would not be associated with a positive score without taking into consideration other customer experience-related data). Alternatively, in at least some embodiments, customer experience-related data associated with the inverse or opposite of the blacklist allows the score component 220 to automatically associate the website with a positive score (e.g., a website associated with a merchant that has a BBB® brand rating of "A" would be associated with a positive score without taking into consideration other customer experience-related data).

The recommendation component 230 is configured to communicate with the interface component 210 and/or the score component 220, and generate one or more recommendations associated with one or more entities. For example, a recommendation may be generated for a website associated with usage data received from the client device 240 (e.g., a website currently being presented on the web browser). The recommendation may be transmitted, to the client device 240 (e.g., via the interface component 210), and presented to the user 270 at the client device 240. For example, the recommendation may include data (e.g., a score, a hyperlink, contact information) associated with one or more recommended entities (e.g., second websites, second entities) that are anticipated or projected to provide a customer experience that is comparable to or better than an anticipated or projected customer experience associated with a target website (e.g., the website currently being presented on the web browser).

The one or more recommendations may be generated based on usage data associated with a client device 240 and/or customer experience-related data associated with an entity. In some embodiments, the recommendation component 230 is configured to identify attributes or characteristics of a merchant associated with the target website or of goods and/or services marketed and/or offered to be sold by the merchant associated with the target website and, based on the identified attributes or characteristics, identify one or more candidate websites that are comparable to or better than the target website. For example, the recommendation component 230 may identify one or more candidate websites that market and/or offer to sell one or more goods and/or services having one or more attributes or characteristics (e.g., model, brand, color, condition, price, approval rating) that are the same as, substantially similar to, or better than the attributes or characteristics of the goods and/or services marketed and/or offered to be sold on the target website. Additionally or alternatively, the recommendation component 230 may identify one or more candidate websites that are associated with one or more merchants having one or more attributes or characteristics (e.g., goods and/or services marketed and/or offered to be sold, industry, geographical location, approval rating) that are the same as, substantially similar to, or better than the attributes or characteristics of the merchant associated with the target website.

In some embodiments, the recommendation component 230 compares a score associated with target website with a predetermined threshold to determine whether to generate one or more recommendations for the target website. When the target website score satisfies the predetermined threshold, the target website is determined to be satisfactory and one or more recommendations may not be generated. For example, one or more recommendations may not be generated when the target website score is a positive score. On the other hand, when the target website score does not satisfy the predetermined threshold, the target website is determined to be not satisfactory and one or more recommendations may be generated. For example, one or more recommendations may be generated when the target website score is a neutral score or a negative score.

A recommended website may be determined by identifying one or more candidate websites, and comparing a score associated with a candidate website with a score associated with the target website. For example, the recommendation component 230 may compare a candidate website score with the target website score to determine whether the candidate website score is comparable to or better than (e.g., greater than or equal to) the target website score, and identify the candidate website as a recommend website if the candidate website score is comparable to or better than the target website score. If the candidate website score is not comparable to or better than (e.g., less than) the target website score, the candidate website is not identified as a recommended website.

The recommendation component 230 may compare a score associated with a recommended website with a predetermined threshold to determine whether to transmit the recommendation to the client device 240. When the recommended website score satisfies the predetermined threshold, the recommended website is determined to be satisfactory and data (e.g., a score, a hyperlink, contact information) associated with the recommended website is transmitted to the client device 240 (e.g., via the interface component 210) for presentation at the client device 240. For example, data associated with the recommended website may be transmitted to the client device 240 when the recommended website score is a positive score. On the other hand, when the recommended website score does not satisfy the predetermined threshold, the recommended website is determined to be not satisfactory and data associated with the recommended website may not be transmitted to the client device 240. For example, data associated with the recommended website may not be transmitted to the client device 240 when the recommended website score is a neutral score or a negative score.

Figure 3:
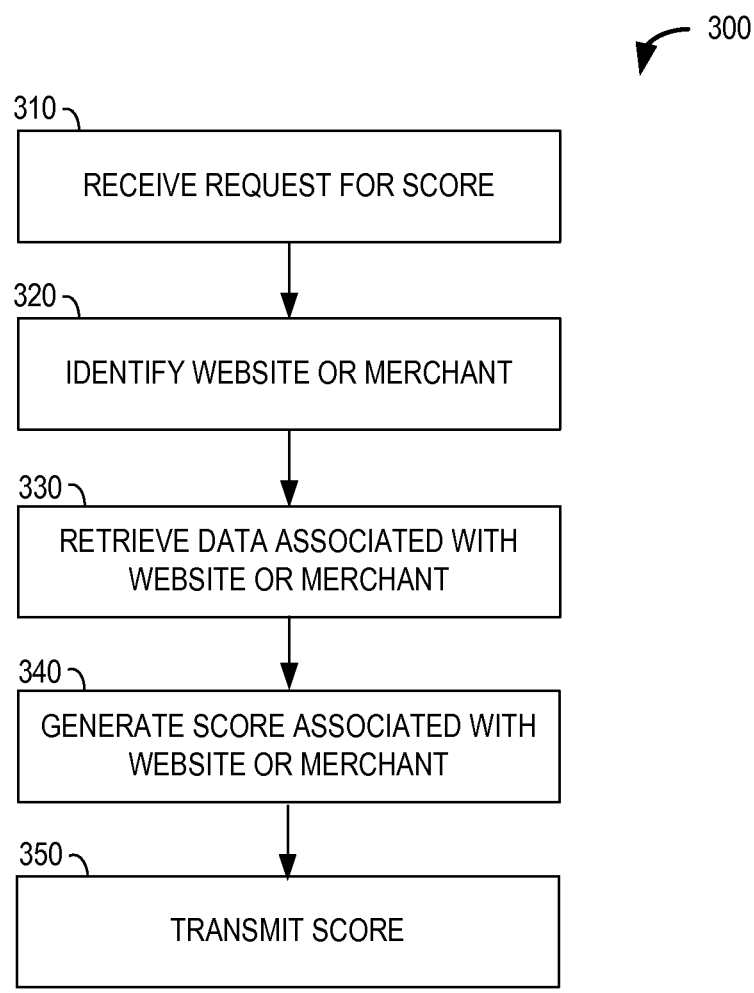
FIG. 3 is a flowchart of an example method of evaluating a credibility of a website and/or a merchant associated with the website.

FIG. 3 is a flowchart of an example method 300 of evaluating a credibility of a website and/or a merchant associated with the website in the environment 100 (shown in FIG. 1) using the credibility evaluation computing device 200 (shown in FIG. 2).

The credibility evaluation computing device 200 receives at 310 a request for a score. In some embodiments, the request for a score is transmitted from a client device 240. For example, the client device 240 may include a web browser that has an extension (e.g., a browser component) configured to receive user input (e.g., click, hover) and trigger one or more operations (e.g., transmitting the request for a score) based on the user input. Alternatively, the request for a score may be transmitted from any device using any mechanism that enables the environment 100 to function as described herein. The request for a score may include or be associated with usage data accumulated or collected at the client device 240. In some embodiments, the usage data is received at approximately the same time the request for a score is received. Alternatively, the usage data and/or the request for a score may be transmitted and/or received at any time that enables the credibility evaluation computing device 200 to function as described herein.

The usage data is associated with one or more websites accessed by the client device 240, including the website currently being presented on the web browser. The usage data may also include a browsing history, one or more cookies, and/or site data. A merchant associated with a website (e.g., the website currently being presented on the web browser) is identified at 320 based on the usage data. Customer experience-related data associated with the merchant and/or the usage data (e.g., a website) is retrieved at 330 from one or more sources (e.g., a source device 250). In at least some embodiments, at least a portion of the customer experience-related data is retrieved from at least one source that is selected or identified based on the merchant and/or the usage data.

A score that is indicative of an anticipated or projected customer experience is generated at 340 based on the customer experience-related data. The score may be biased to be a neutral score. In some embodiments, the score is generated based on an association of a first weight with a first portion of the customer experience-related data (e.g., data corresponding to a first source of the one or more sources) and/or an association of a second weight with a second portion of the customer experience-related data (e.g., data corresponding to a second source of the one or more sources). In at least some embodiments, the score is automatically determined to be a positive score when a portion of the customer experience-related data is identified to be associated with a whitelist. Additionally or alternatively, the score may be automatically determined to be a negative score when a portion of the customer experience-related data is identified to be associated with a blacklist.

The score is transmitted at 350 to the client device 240 for presentation at the client device 240. For example, the browser component may generate a secondary window (e.g., a popup window, a floating window) configured to present the score. In at least some embodiments, the client device 240 presents an outline of a scoring methodology and/or a hyperlink to a website including information about the scoring methodology.

In at least some embodiments, one or more scores may be generated at 340 for one or more entities and, upon receiving a request for a score, a score may be selected and/or identified (e.g., from the one or more generated scores) for transmission to the client device 240. For example, the request for a score, including usage data, may be received at a credibility evaluation computing device 200 including and/or with having access to one or more pre-generated scores. A website may be identified based on the usage data and, if a score of the one or more generated scores corresponds with a merchant associated with the website, the corresponding score is transmitted to the client device 240. If no score of the one or more generated scores corresponds with a merchant associated with the website, a default score (e.g., a neutral score) is transmitted to the client device 240.

Figure 4:
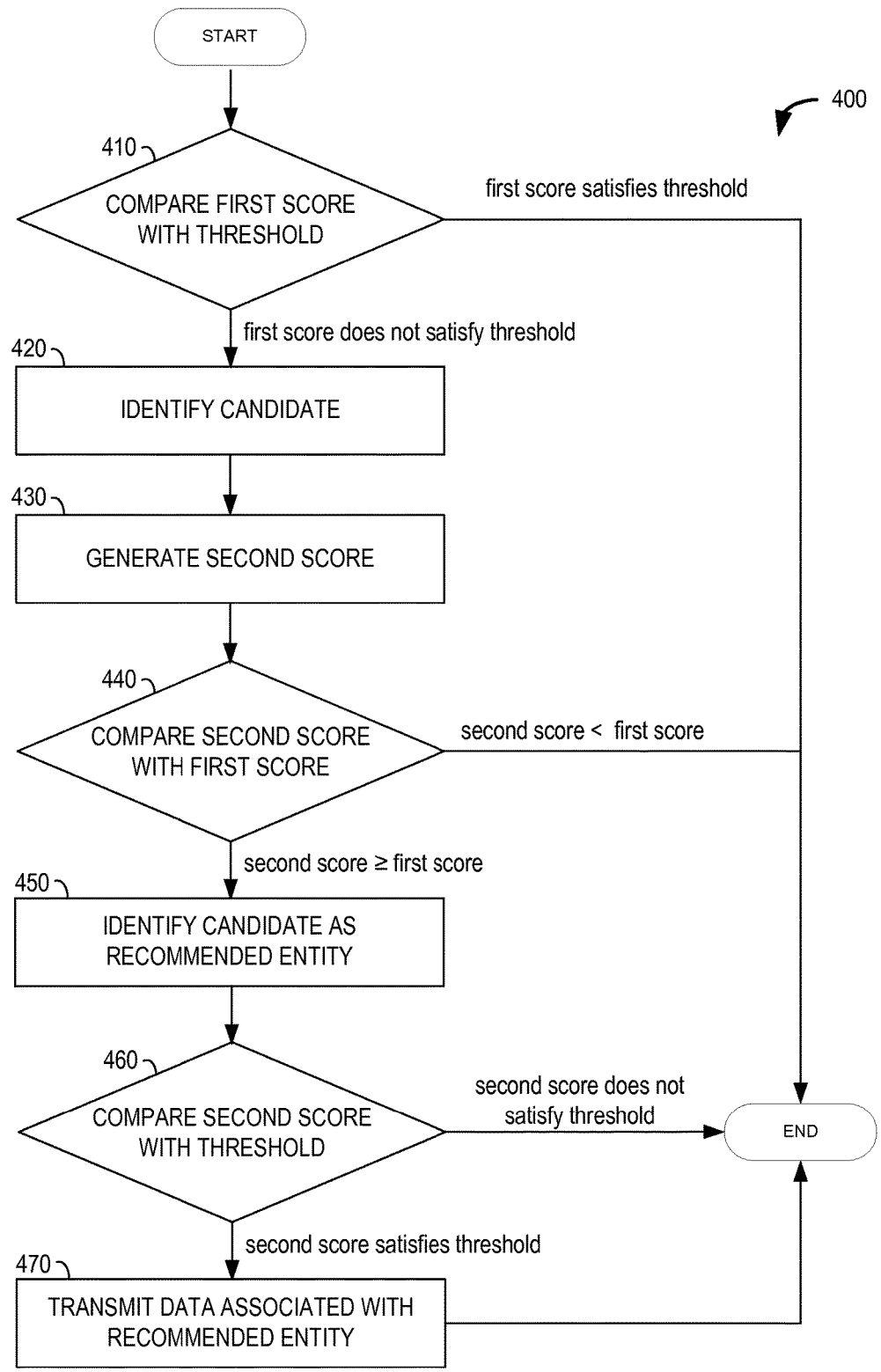
FIG. 4 is a flowchart of an example method of generating a recommendation of a website and/or a merchant.

FIG. 4 is a flowchart of an example method 400 of generating a recommendation in the environment 100 (shown in FIG. 1) using the credibility evaluation computing device 200 (shown in FIG. 2). In at least some embodiments, a score generated for transmission to a client device 240 is compared at 410 with a predetermined threshold to determine whether the score satisfies the predetermined threshold (e.g., whether a score is associated with an entity that is anticipated or projected to provide a positive customer experience). If the score satisfies a predetermined threshold, the credibility evaluation computing device 200 may not generate one or more recommendations (e.g., including one or more recommended websites and/or merchants).

If the score does not satisfy the predetermined threshold, one or more entities that are comparable to an entity associated with the score (e.g., a target website, a target merchant) may be identified to generate one or more recommendations, and the one or more recommendations (e.g., including data associated with one or more recommended entities) are transmitted to the client device 240. Additionally or alternatively, if the score does not satisfy the predetermined threshold, one or more products (e.g., goods, services) that are comparable to one or more products marketed and/or offered to be sold on the target website may be identified, and one or more entities that market and/or offer to sell the one or more identified products are identified to generate the one or more recommendations.

In at least some embodiments, one or more entities (e.g., candidates) are identified at 420 based on usage data (e.g., the target website) and/or a merchant associated with the usage data. One or more scores (e.g., candidate scores) may be generated at 430 for the one or more candidates based on customer experience-related data. The candidate scores are compared at 440 with the score associated with the target website (e.g., target score) to determine whether the candidate scores satisfy a predetermined threshold (e.g., whether a candidate score is greater than or equal to a target score). If the candidate score does not satisfy the predetermined threshold, the credibility evaluation computing device 200 determines that a corresponding candidate is not anticipated or projected to provide a positive customer experience (e.g., an experience better than or equal to a projected customer experience associated with the target website) and may not identify the corresponding candidate as a recommended entity.

If the candidate score satisfies the predetermined threshold, the corresponding candidate is anticipated or projected to provide a customer experience that is better than or equal to a projected customer experience associated with the target website and, thus, may be identified at 450 as a recommended entity that may be included in and/or associated with one or more recommendations. In at least some embodiments, a score associated with the recommended entity is compared at 460 with a predetermined threshold to determine whether the score is transmitted at 470 to the client device 240 for presentation at the client device 240. For example, if the score associated with the recommended entity satisfies the predetermined threshold, a recommendation including data (e.g., a score, a hyperlink, and/or contact information) associated with the recommended entity is transmitted to the client device 240. Conversely, if the score associated with the recommended entity does not satisfy the predetermined threshold, the recommendation may not be transmitted to the client device 240. In some embodiments, at least some portions of the method 400 may be iteratively implemented and/or performed to recommend at least one entity.

Figure 5:
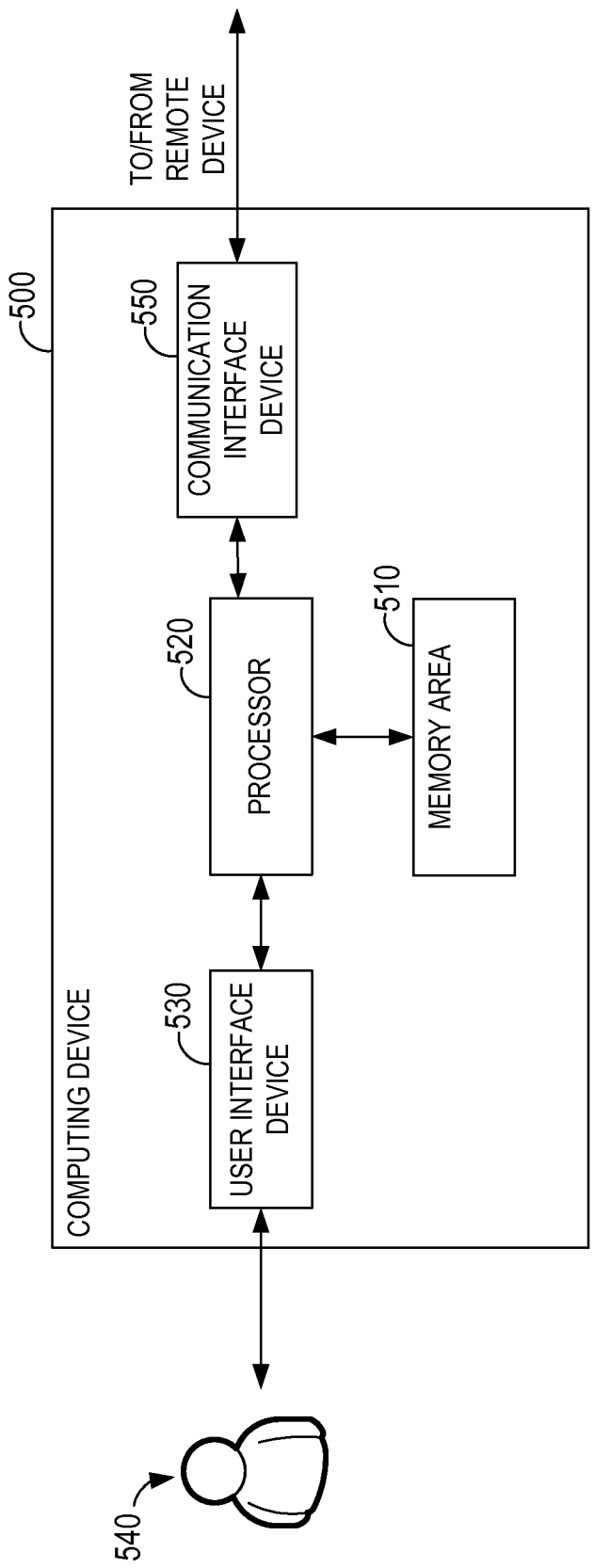
FIG. 5 is a block diagram illustrating an example computing device that may be used to evaluate a credibility of a website and/or a merchant associated with the website.

FIG. 5 is a block diagram illustrating an example computing device 500 that may be used to evaluate a credibility of a website and/or a merchant associated with the website in the environment 100 (shown in FIG. 1). While some embodiments of the disclosure are illustrated and described herein with reference to the computing device 500 being or including a credibility evaluation computing device 200 (shown in FIG. 2), aspects of the disclosure are operable with any computing device (e.g., client device 240, source device 250, merchant device 280) that executes instructions to implement the operations and functionality associated with the computing device 500.

For example, the computing device 500 may include a mobile device, a mobile telephone, a phablet, a tablet, a portable media player, a netbook, a laptop, a desktop computer, a computing pad, a kiosk, a tabletop device, an industrial control device, and other computing devices. The computing device 500 may represent a group of processing units or other computing devices. Additionally, any computing device described herein may be configured to perform any operation described herein including one or more operations described herein as being performed by another computing device.

The computing device 500 includes one or more computer-readable media, such as a memory area 510 storing computer-executable instructions, merchant information (e.g., scores, customer experience-related data), usage data, browser data, and other data, and one or more processors 520 programmed to execute the computer-executable instructions for implementing aspects of the disclosure. For example, the memory area 510 may include an interface component 210 (shown in FIG. 2), a score component 220 (shown in FIG. 2), and/or a recommendation component 230 (shown in FIG. 2). The memory area 510 includes any quantity of media associated with or accessible by the computing device 500. The memory area 510 may be internal to the computing device 500 (as shown in FIG. 5), external to the computing device 500 (not shown), or both (not shown).

The processor 520 includes any quantity of processing units, and the instructions may be performed by the processor 520 or by multiple processors within the computing device 500 or performed by a processor external to the computing device 500. The processor 520 is programmed to execute instructions such as those illustrated in the figures (e.g., FIGS. 3 and/or 4).

Upon programming or execution of these instructions, the processor 520 is transformed into a special purpose microprocessor or machine. For example, the interface component 210, when executed by the processor 520, causes the processor 520 to receive a request for a score, retrieve customer experience-related data, transmit the score for presentation at a client device, and/or transmit a recommendation for presentation at the client device; the score component 220, when executed by the processor 520, causes the processor 520 to identify a merchant, identify at least one source, identify a portion of the customer experience-related data associated with a whitelist, identify a portion of the customer experience-related data associated with a blacklist, generate a score, bias the score to be a neutral score, and/or associate a weight with a portion of the customer experience-related data; and the recommendation component 230, when executed by the processor 520, causes the processor 520 to identify a product, identify a merchant, and/or determine whether a score satisfies a predetermined threshold. Although the processor 520 is shown separate from the memory area 510, embodiments of the disclosure contemplate that the memory area 510 may be onboard the processor 520 such as in some embedded systems.

The computing device 500 includes at least one user interface 530 for exchanging data between the computing device 500 and a user 540. For example, the user interface 530 includes or is coupled to a presentation device configured to present information, such as text, images, audio, video, graphics, alerts, and the like, to the user 540. The presentation device may include, without limitation, a display, a speaker, or a vibrating component. Additionally or alternatively, the user interface 530 may include or be coupled to an input device (not shown) configured to receive information, such as user commands, from the user 540. The input device may include, without limitation, a controller, a camera, a microphone, or an accelerometer. In at least some embodiments, the presentation device and the input device are integrated in a common user interface 530 configured to present information to the user 540 and receive information from the user 540. For example, the user-interface device may include, without limitation, a capacitive touch screen display or a controller including a vibrating component. In some embodiments, the user 540 may interface with the computing device 500 via another computing device.

The computing device 500 includes at least one communication interface 550 for exchanging data between the computing device 500 and a computer-readable media or another computing device. For example, the computing device 500 may be coupled to a server, a financial transaction processing computing device, a financial transaction device (e.g., a POS terminal), a detection device, and/or a detected device via a network and/or the Internet. Communication between the computing device 500 and a computer-readable media or another computing device may occur using any protocol or mechanism over any wired or wireless connection.

The block diagram of FIG. 5 is merely illustrative of an example system that may be used in connection with one or more embodiments of the disclosure and is not intended to be limiting in any way. Further, peripherals or components of the computing devices known in the art are not shown, but are operable with aspects of the disclosure. At least a portion of the functionality of the various elements in FIG. 5 may be performed by other elements in FIG. 5, or an entity (e.g., processor, web service, server, applications, computing device, etc.) not shown in FIG. 5.

Figure 6:
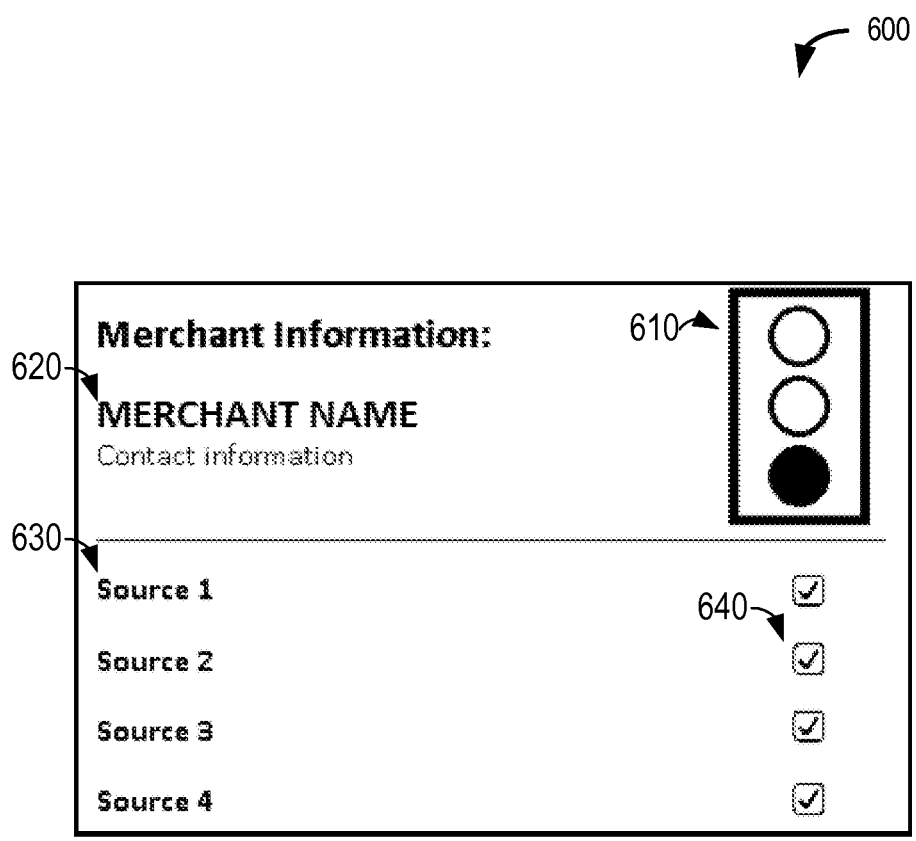
FIG. 6 is an example screenshot for reporting a credibility of a website and/or a merchant.

FIG. 6 is an example screenshot 600 for reporting a credibility of a website and/or a merchant on a client device (e.g., a client device 240). The screenshot 600 may be presented in a window (e.g., a secondary window) configured to present data associated with a website and/or a merchant associated with the website. The screenshot 600 enables a user (e.g., a cardholder 160, a user 270) to make a more-educated decision when evaluating the website and/or the merchant associated with the website. For example, a score 610 for a website and/or a merchant associated with the website is presented on the screenshot 600 to provide the user with some notice of a projected customer experience. In at least some embodiments, merchant data 620 (e.g., name, contact information) for the merchant associated with the website is presented on the screenshot 600. The screenshot 600 may include an outline or listing 630 of one or more sources from which data was received and/or retrieved to generate the score 610, and an abstract or subscore 640 for each source that is indicative of a projected cardholder experience determined based on a corresponding source. For example, a green checked box may be indicative of a positive cardholder experience, a black box (e.g., unchecked) may be indicative of a neutral cardholder experience, and a red crossed (e.g., "X"-ed) box may be indicative of a negative cardholder experience.

The subject matter described herein enables a credibility of a website and/or merchant to be evaluated based on customer experience-related data. One or more websites and/or merchants are evaluated by one or more reliable sources. In this manner, a cardholder is enabled to use the information generated from the evaluation to make a more-educated decision when shopping on the Internet.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, embodiments of the disclosure are capable of implementation with numerous other general purpose or special purpose computing system environments, configurations, or devices.

Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for evaluating a credibility of a merchant. For example, the elements illustrated in FIG. 1, 2, or 5 such as when encoded to perform the operations illustrated in FIG. 3 or 4 constitute at least an example means for receiving a request for a score including usage data associated with a client device (e.g., interface component 210), an example means for identifying a merchant based on usage data (e.g., score component 220), an example means for retrieving customer experience-related data associated with usage data and/or a merchant (e.g., interface component 210), an example means for generating a score based on customer experience-related data (e.g., score component 220), and/or an example means for transmitting a score for presentation at a client device (e.g., interface component 210).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computer-implemented method comprising:
   receiving, by a processor, from a browser extension of a web browser in a client device, usage data associated with the client device;
   based on the usage data, identifying, by the processor, a website currently being presented on the web browser and a merchant associated with the web site;
   retrieving, by the processor, from one or more sources, customer experience-related data associated with the website and the merchant associated with the web site;
   aggregating, by the processor, the retrieved customer experience-related data;
   based on the aggregated customer experience-related data, generating, at a score generator, a first score associated with the website and the merchant associated with the web site; and
   presenting, by the browser extension, the generated first score in a secondary window on the client device, the generated first score being indicative of a projected customer experience relating to the website and the merchant associated with the website.

2. The computer-implemented method of claim 1, further comprising categorizing the generated first score as positive when a first portion of the retrieved customer experience-related data associated with a positive customer experience is valued more than a second portion of the retrieved customer experience-related data associated with a negative customer experience.

3. The computer-implemented method of claim 1, wherein generating a first score comprises:
   associating a first weight with a first portion of the customer experience-related data, the first portion corresponding to a first source of the one or more sources; and
   associating a second weight with a second portion of the customer experience-related data, the second portion corresponding to a second source of the one or more sources, the first score generated based on the association of the first weight with the first portion and the association of the second weight with the second portion.

4. The computer-implemented method of claim 1, wherein the first score is configured for presentation in the secondary window in a first color when the first score is positive, a second color when the first score is neutral, and a third color when the first score is negative.

5. The computer-implemented method of claim 1, wherein generating a first score comprises identifying that a portion of the customer experience-related data is associated with a blacklist, wherein the first score is generated to be a negative score based on the association of the portion with the blacklist.

6. The computer-implemented method of claim 1, wherein generating a first score comprises biasing the first score to be a neutral score.

7. The computer-implemented method of claim 1, further comprising:
   based on the website and the merchant associated with the website, identifying another website and another merchant associated with the another website; and
   transmitting a recommendation for presentation in the secondary window at the client device, the recommendation associated with the another website and the another merchant.

8. The computer-implemented method of claim 1, further comprising:
   based on the usage data, identifying a product;
   based on the identified product, identifying one or more other websites and merchants associated with the one or more other websites; and
   transmitting a recommendation for presentation at the client device, the recommendation associated with the one or more other websites and the merchants associated with the one or more of other websites.

9. The computer-implemented method of claim 1, further comprising:
   determining whether the first score satisfies a predetermined threshold; and
   on condition that the first score does not satisfy the predetermined threshold, identifying one or more additional websites and merchants associated with the one or more additional websites, and transmitting a recommendation for presentation in the secondary window at the client device, the recommendation associated with the one or more additional websites and the merchants associated with the one or more additional websites.

10. The computer-implemented method of claim 1, further comprising:
    based on the website and the merchant associated with the website, identifying one or more other websites and merchants associated with the one or more other websites;
    retrieving, from the one or more sources, other customer experience-related data associated with the one or more other websites and the merchants associated with the one or more other websites;
    based on the retrieved other customer experience-related data, generating another score associated with the one or more other websites and the merchants associated with the one or more of the other websites; and
    transmitting the another score for presentation in the secondary window at the client device.

11. A computing device comprising:
    a memory storing data associated with one or more entities, and computer-executable instructions, the one or more entities including a website and a merchant; and
    a processor configured to execute the computer-executable instructions to:
       based on the data associated with the one or more entities associated with content currently being presented in a web browser, generate one or more scores;
       receive, from a browser extension of the web browser in a client device, a request for a score, the request including usage data associated with the client device;
       based on the usage data, retrieve from one or more sources, customer experience-related data associated with the one or more entities;
       aggregate, the retrieved customer experience-related data;
       based on the aggregated customer experience-related data, identify a first entity of the one or more entities;
       on condition that the one or more generated scores include a first score that corresponds to the identified first entity, present, by the browser extension, the first score in a secondary window on the client device, the first score being indicative of a projected customer experience relating to the identified first entity.

12. The computing device of claim 11, wherein the processor is further configured to categorize the generated first score as positive when a first portion of the retrieved customer experience-related data associated with a positive customer experience is valued more than a second portion of the retrieved customer experience-related data associated with a negative customer experience.

13. The computing device of claim 11, wherein the processor is further configured to execute the computer-executable instructions to:
   associate a first weight with a first portion of the data; and
   associate a second weight with a second portion of the data, the one or more scores generated based on the association of the first weight with the first portion and the association of the second weight with the second portion.

14. The computing device of claim 11, wherein the processor is further configured to execute the computer-executable instructions to:
   determine whether the first score satisfies a predetermined threshold; and
   on condition that the first score does not satisfy the predetermined threshold, identify a second entity of the one or more entities based on the identified first entity, and present, in the secondary window on the client device, data associated with the second entity.

15. The computing device of claim 11, wherein the processor is further configured to execute the computer-executable instructions to:
   based on the usage data, identify a product;
   based on the identified product, identify a second entity of the one or more entities; and
   present, in the secondary window on the client device, data associated with the second entity.

16. The computing device of claim 14, wherein the processor is further configured to execute the computer-executable instructions to:
   based on the identified second entity, identify a third entity of the one or more entities, the third entity associated with a third score of the one or more generated scores; and
   present, in the secondary window on the client device, the third score.

17. A computer-readable storage device having computer-executable instructions embodied thereon, wherein, upon execution by at least one processor, the computer executable instructions cause the at least one processor to:
   based on data associated with one or more entities associated with content currently being presented in a web browser, generate one or more scores associated with the one or more entities;
   receive, from a browser extension of the web browser in a client device, a request for a score;
   retrieve, from the browser extension of the web browser in the client device, usage data associated with the client device;
   based on the usage data, retrieve from one or more sources, customer experience-related data associated with the one or more entities;
   aggregate, the retrieved customer experience-related data;
   based on the aggregated customer experience-related data, identify a first entity of the one or more entities;
   on condition that the one or more generated scores include a first score that corresponds to the identified first entity, present, by the browser extension, the first score in a secondary window on the client device, the first score being indicative of a projected customer experience associated with the first entity.

18. The computer-readable storage device of claim 17, wherein, upon execution by the at least one processor, the computer-executable instructions further cause the at least one processor to:
   categorize the first score as positive when a first portion of the retrieved customer experience-related data associated with a positive customer experience is valued more than a second portion of the retrieved customer experience-related data associated with a negative customer experience.

19. The computer-readable storage device of claim 17, wherein, upon execution by the at least one processor, the computer-executable instructions further cause the at least one processor to:
   determine whether the first score indicative of the projected customer experience satisfies a predetermined threshold; and
   on condition that the first score indicative of the projected customer experience does not satisfy the predetermined threshold, identify a second entity of the one or more entities, and transmit, to the client device, data associated with the second entity.

20. The computer-readable storage device of claim 17, wherein, upon execution by the at least one processor, the computer-executable instructions further cause the at least one processor to:
   compare a second score of the one or more generated scores with the first score indicative of the projected customer experience; and
   on condition that the second score is greater than or equal to the first score indicative of the projected customer experience, identify a second entity of the one or more entities that is associated with the second score as a recommended entity, and transmit, to the client device, data associated with the second entity.

* * * * *